US012350630B2

(12) United States Patent
Anzai

(10) Patent No.: US 12,350,630 B2
(45) Date of Patent: Jul. 8, 2025

(54) ULTRA FINE BUBBLE PRODUCTION DEVICE

(71) Applicant: Satoshi Anzai, Yokohama (JP)

(72) Inventor: Satoshi Anzai, Yokohama (JP)

( * ) Notice: Subject to any disclaimer, the term of this patent is extended or adjusted under 35 U.S.C. 154(b) by 180 days.

(21) Appl. No.: 18/271,576

(22) PCT Filed: Jan. 11, 2022

(86) PCT No.: PCT/JP2022/000546
§ 371 (c)(1),
(2) Date: Jul. 10, 2023

(87) PCT Pub. No.: WO2022/153972
PCT Pub. Date: Jul. 21, 2022

(65) Prior Publication Data

US 2024/0139694 A1 May 2, 2024

(30) Foreign Application Priority Data

Jan. 13, 2021 (JP) ................................ 2021-003676

(51) Int. Cl.
*B01F 25/10* (2022.01)
*B01F 23/231* (2022.01)
(Continued)

(52) U.S. Cl.
CPC .... *B01F 25/103* (2022.01); *B01F 23/231233* (2022.01); *B01F 23/231265* (2022.01);
(Continued)

(58) Field of Classification Search
CPC ...... B01F 23/231233; B01F 23/231265; B01F 23/232; B01F 23/2373; B01F 25/103; B01F 35/71745; B01F 2101/305
(Continued)

(56) References Cited

U.S. PATENT DOCUMENTS 1,967,799 A * 7/1934 Wittemann .......... B67D 1/0058 261/DIG. 7
8,186,653 B2 * 5/2012 Tsuji .................. B01F 23/2326 261/92
(Continued)

FOREIGN PATENT DOCUMENTS

FR 2750889 A1 * 1/1998
JP 2008279351 A 11/2008
(Continued)

OTHER PUBLICATIONS

English Machine Translation of FR 2750889 A1 (Year: 1998).*
(Continued)

*Primary Examiner* — Charles S Bushey
(74) *Attorney, Agent, or Firm* — CANTOR COLBURN LLP

(57) ABSTRACT

Provided is an ultra fine bubble production device capable of causing a liquid current to flow in a helical manner without reducing a flow rate of the liquid current while reducing the number of components. The ultra fine bubble production device includes the pipe, the compression device, and the gas bubble production medium. The gas bubble production medium is formed of a carbon-based porous material, the pipe has the side surface having a cylindrical shape and the end surfaces having a circular shape, the liquid current inflow port is provided on the side surface, the cylindrical guide member is arranged so as to be connected to the liquid current inflow port, and the guide member has the guide groove having a helical shape.

2 Claims, 7 Drawing Sheets

(51) Int. Cl.

| | |
|---|---|
| ***B01F 23/232*** | (2022.01) |
| ***B01F 23/2373*** | (2022.01) |
| ***B01F 35/71*** | (2022.01) |
| *B01F 101/00* | (2022.01) |

(52) U.S. Cl.
CPC ........ *B01F 23/232* (2022.01); *B01F 23/2373* (2022.01); *B01F 35/71745* (2022.01); *B01F 2101/305* (2022.01)

(58) Field of Classification Search
USPC ........................................................ 261/79.2
See application file for complete search history.

(56) References Cited

U.S. PATENT DOCUMENTS

| | | | | |
|---|---|---|---|---|
| 8,556,236 | B2 * | 10/2013 | Glomset | B01F 25/312 261/76 |
| 11,511,241 | B2 * | 11/2022 | Fujita | B01F 23/2331 |
| 2012/0175791 | A1 | 7/2012 | Anzai et al. | |
| 2017/0259219 | A1 | 9/2017 | Russell et al. | |
| 2019/0262783 | A1 | 8/2019 | Anzai | |
| 2020/0003506 | A1 | 1/2020 | Russell et al. | |
| 2020/0182566 | A1 | 6/2020 | Russell et al. | |
| 2020/0330933 | A1 * | 10/2020 | Fujita | B01F 23/23123 |

FOREIGN PATENT DOCUMENTS

| | | | |
|---|---|---|---|
| JP | 2010167404 | A | 8/2010 |
| JP | 2019509894 | A | 4/2019 |
| JP | 2020189283 | A | 11/2020 |
| WO | WO 02/36252 | A1 * | 5/2002 |
| WO | 2017069189 | A1 | 4/2017 |
| WO | 2017217402 | A1 | 12/2017 |

OTHER PUBLICATIONS

English Machine Translation of WO 02/36252 A1 (Year: 2002).*
International Search Report for International Application No. PCT/JP2022/000546; Date of Mailing Feb. 15, 2022.

* cited by examiner

ULTRA FINE BUBBLE PRODUCTION DEVICE

CROSS REFERENCE TO RELATED APPLICATIONS

This is the U.S. national stage of application No. PCT/JP2022/000546, filed on Jan. 11, 2022. Priority under 35 U.S.C. § 119 (a) and 35 U.S.C. § 365 (b) is claimed from Japanese Application No. 2021-003676, filed Jan. 13, 2021, the disclosure of which is also incorporated herein by reference.

TECHNICAL FIELD

The present invention relates to a technique of an ultra fine bubble production device.

BACKGROUND ART

Conventionally, an ultra fine bubble production device that generates ultra fine bubbles such as a microbubble and a nanobubble having a diameter of several hundred nm to several ten μm is publicly known. Ultra fine bubbles are used for purification of contaminated water, cultivation of fish and shellfish, and the like, and are known to be useful for improvement of water quality.

As a method of producing an ultra fine bubble by an ultra fine bubble production device, a swirling liquid current method, a pressurization dissolution method, an orifice or venturi tube method, an ultrasonic vibration method, a method using an ultra fine pore filter, and the like are publicly known. For example, in an ultra fine bubble production device described in Patent Literature 1, gas is pressure-fed to an internal space of a gas bubble production medium via a gas supply path, the gas bubble production medium is formed of a high-density composite, the pressure-fed gas is separated from a surface of the gas bubble production medium, and an ultra fine bubble is produced.

Further, in an ultra fine bubble production device described in Patent Literature 2, a gas storage pipe, a cylindrical outer shell layer covering the gas storage pipe, and a porous member is disposed in a part of the gas storage pipe, and a method of forming a narrow gap between the porous member and an inner peripheral surface of the outer shell tank, releasing gas in the gas storage pipe into the gap via the porous member, separating a bubble from a surface of the porous member by liquid flowing through the gap at a high speed, and, immediately after that, rapidly releasing pressure of flow of the liquid to generate an ultra fine bubble is shown. Further, according to the ultra fine bubble production device described in Patent Literature 2, there is disclosed a method in which water is turned into a high-speed swirling flow by a helical current control plate in an outer shell tank, so that a bubble released from a porous member in a narrow gap is separated from a surface of the porous member by water (liquid) that swirls at a high speed, and an ultra fine bubble is generated while swirling is continued in mixture with the liquid.

CITATIONS LIST

Patent Literature

Patent Literature 1: JP-A 2010-167404 Gazette
Patent Literature 2: JP-A 2020-189283 Gazette

SUMMARY OF INVENTION

Technical Problems

However, in a conventional ultra fine bubble production device, it is necessary to provide a current control plate in an outer shell layer, and an additional process is required in a manufacturing process of the outer shell layer. Further, since a plurality of current control plates are provided, there has been possibility that friction occurs between a liquid current and the current control plate toward the downstream side, and a flow rate decreases. Further, in a case where the current control plate is disposed in an outer shell layer of a pipe, there has been possibility that dust such as hair and a suspended matter contained in a liquid current are accumulated in the current control plate, and a cross-sectional area of a liquid passage is narrowed.

Therefore, in view of such a problem, the present invention provides an ultra fine bubble production device capable of causing a liquid current to flow in a helical manner without reducing a flow rate of the liquid current while reducing the number of components.

Solutions to Problems

The problem to be solved by the present invention is as described above, and means for solving the problem will be described below.

That is, in the present invention, there is provided an ultra fine bubble production device including a pipe through which liquid flows, a compression device for pressure-feeding gas to the pipe, and a gas bubble production medium that releases gas pressure-fed by the compression device to liquid in the pipe as an ultra fine bubble. The gas bubble production medium is formed of a carbon-based porous material, and the pipe has a cylindrical side surface and circular end surfaces, a liquid current inflow port is provided on the side surface, a cylindrical guide member is arranged so that a liquid current from the liquid current inflow port is guided, and the guide member has a helical guide groove.

Further, in the present invention, the guide member has a double wall structure including an outer wall and an inner wall, and a notch portion is provided in a part of the outer wall facing a liquid current.

Further, in the present invention, the liquid current inflow port is provided on a side surface of the pipe in a manner facing a position shifted from an axial center of the gas bubble production medium.

Advantageous Effects of Invention

As advantageous effects of the present invention, effects described below are obtained.

In the present invention, as a guide member provided with a helical guide groove is arranged inside a pipe, a liquid current can be swirled in a helical manner without processing of an inner peripheral surface of the pipe, so that there is no additional work process. Further, since the guide member is provided only on a part of the upstream side of the pipe, as compared with a case where a control plate is disposed on the entire pipe, a partition that divides a liquid current is not provided entirely, a chance of collision with a liquid current is reduced, and a liquid current is allowed to flow in a helical manner on a surface of an ultra fine gas bubble production medium without reduction in a speed of the liquid current. Further, as compared with a case where a control plate is provided, a chance that a solid such as hair or a floating substance is caught is reduced, and flow of liquid can be made smooth. Further, since the guide member can be easily removed from the pipe or a gas bubble production medium, cleaning and disassembly can be easily performed.

DESCRIPTION OF EMBODIMENT

Figure 1:
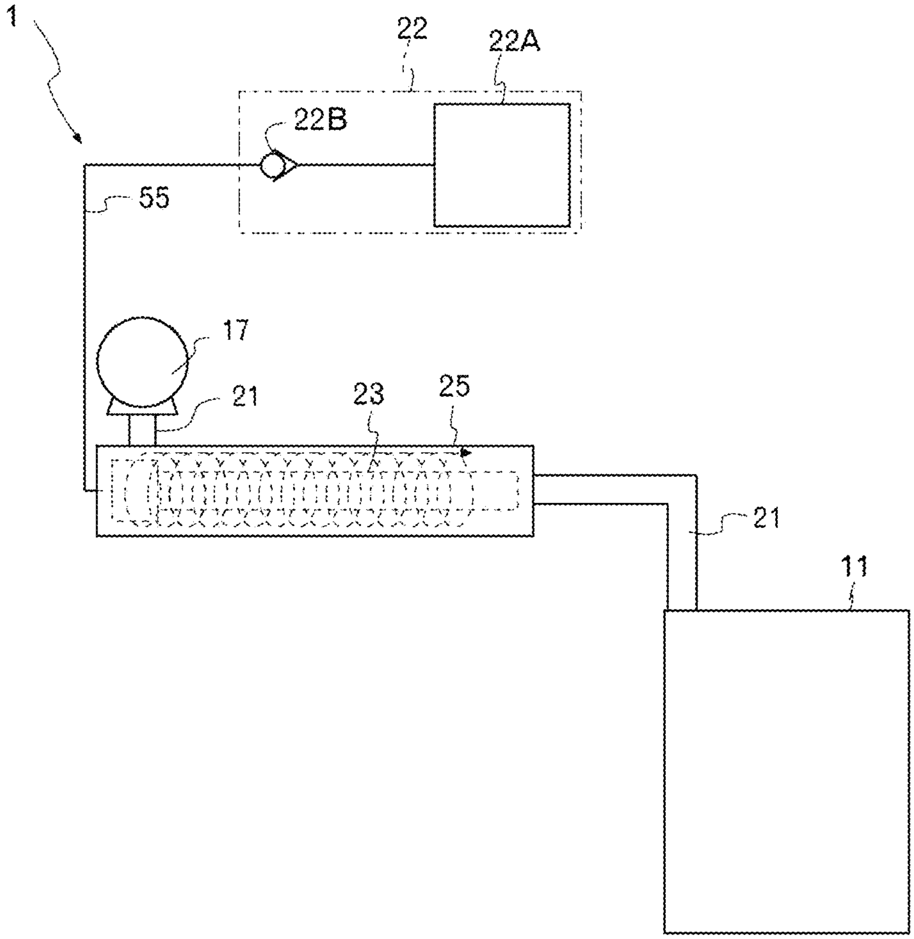
FIG. 1 is a schematic view illustrating an ultra fine bubble production device according to a first embodiment of the present invention.

Next, an embodiment of the invention will be described.

First, an overall configuration of an ultra fine bubble production device 1 according to an embodiment of the present invention will be described with reference to FIG. 1.

The ultra fine bubble production device 1 is an ultra fine bubble production device for cultivation or wastewater treatment, and is a device for producing an ultra fine bubble in liquid. Here, the ultra fine bubble means a bubble having a size (diameter) of less than 100 μm at normal temperature and normal pressure. As illustrated in FIG. 1, the ultra fine bubble production device 1 is a device that supplies liquid in which gas is dissolved or caused to coexist to a storage tank 11, and includes a passage 21 through which liquid flows, a compression device 22 that pressure-feeds gas into liquid flowing through the passage 21, and a gas bubble production medium 23 that discharges gas pressure-fed by the compression device 22 to liquid in the passage 21 as an ultra fine bubble.

The storage tank 11 is a tank that stores liquid in which gas is dissolved or coexists as an ultra fine bubble.

Here, dissolved means a state in which gas exists by being dissolved in liquid. Further, coexists means a state in which gas exists as an ultra fine bubble in liquid.

Liquid stored in the storage tank 11 is seawater or fresh water of a river, a lake, or the like in a case of the ultra fine bubble production device 1 for cultivation, and is seawater, fresh water of a river, a lake, or the like, domestic wastewater, industrial wastewater, or the like in a case of the ultra fine bubble production device 1 for wastewater treatment.

Further, gas supplied to the storage tank 11 is air, oxygen, ozone, hydrogen peroxide, or the like in a case of the ultra fine bubble production device 1 for cultivation, and is a substrate having an oxidizing action, for example, oxygen, ozone, or hydrogen peroxide in a case of the ultra fine bubble production device 1 for wastewater treatment.

In the ultra fine bubble production device 1 for cultivation, fish and shellfish are cultured in the storage tank 11. By culturing fish and shellfish in liquid in which gas is dissolved or coexists as an ultra fine bubble, aerobic bacteria and the like that decompose excrement of fish and shellfish can be activated, and the liquid can be purified. Further, since oxygen is mainly sufficiently supplied, immunity of fish and shellfish to be cultivated is improved, and growth of fish and shellfish can be promoted.

In the ultra fine bubble production device 1 for wastewater treatment, wastewater is treated in the storage tank 11. By treating wastewater in liquid in which gas is dissolved or coexists as an ultra fine bubble, bacteria and the like that decompose an organic substance in the wastewater can be activated, and the liquid can be purified.

The passage 21 is a member through which liquid passes. The passage 21 has an upstream side end portion in flow of liquid connected to a liquid tank, the sea, a river, or the like. Further, a middle portion of the passage 21 is constituted by a pipe 25.

The compression device 22 is a device for pressure-feeding gas to the gas bubble production medium 23. In the present embodiment, the compression device 22 includes a gas storage container 22A that stores gas and a check valve 22B.

Figure 2:
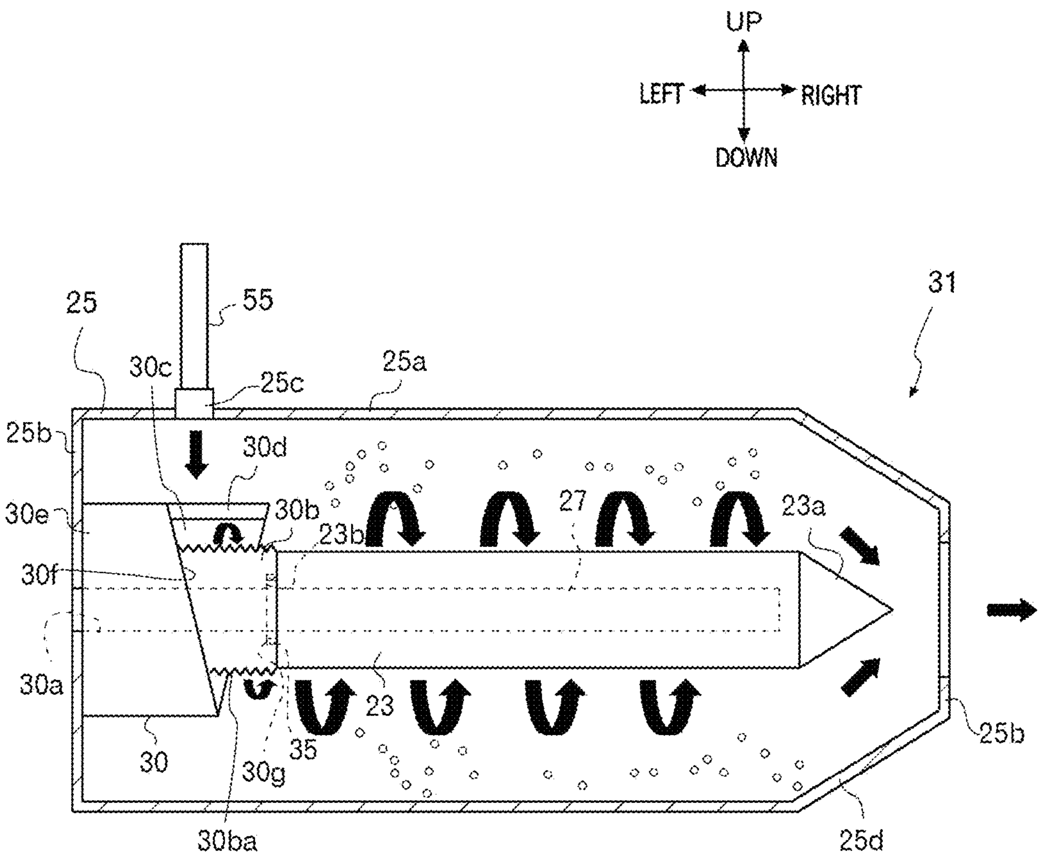
FIG. 2 is a partial front cross-sectional view illustrating the gas bubble production medium according to the first embodiment of the present invention.
Figure 3:
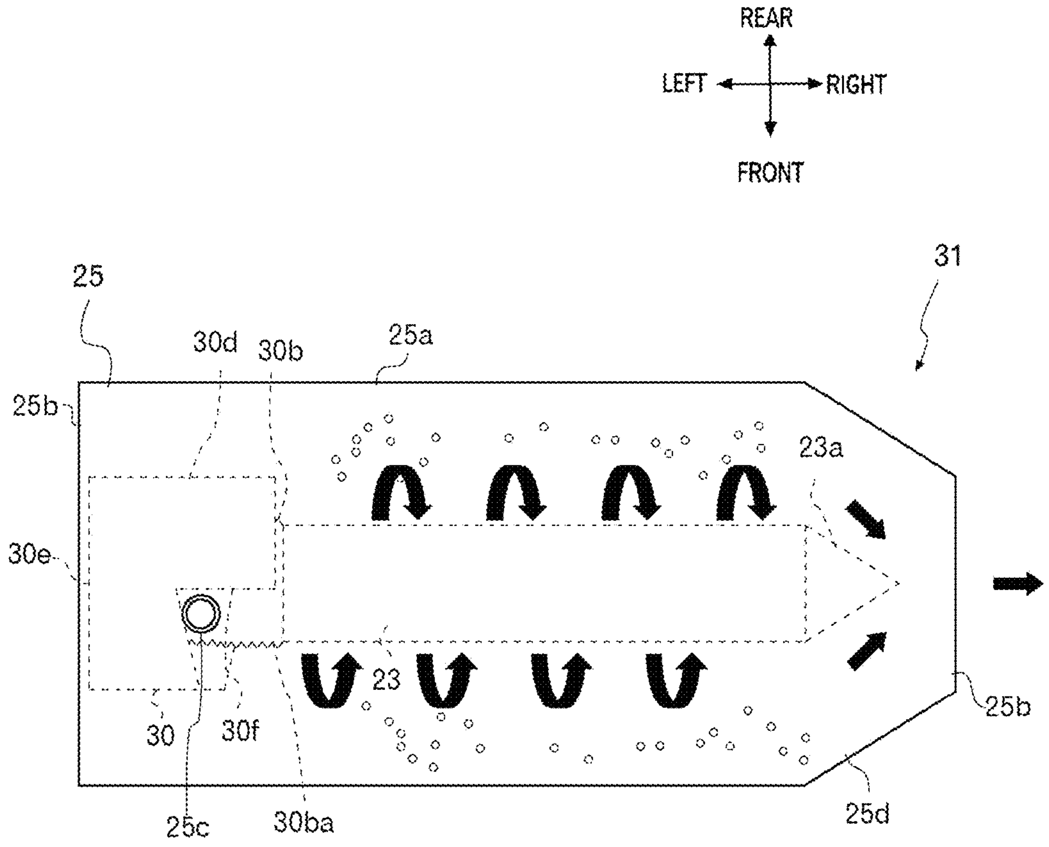
FIG. 3 is a plan view illustrating the gas bubble production medium according to the first embodiment of the present invention.

As illustrated in FIG. 1 to FIG. 3, the gas bubble production medium 23 is disposed inside the pipe 25 constituting a middle portion of the passage 21. The gas bubble production medium 23 is disposed so as to be parallel to a direction in which liquid flows in the pipe 25 (a direction of a black arrow in FIG. 2).

Figure 4:
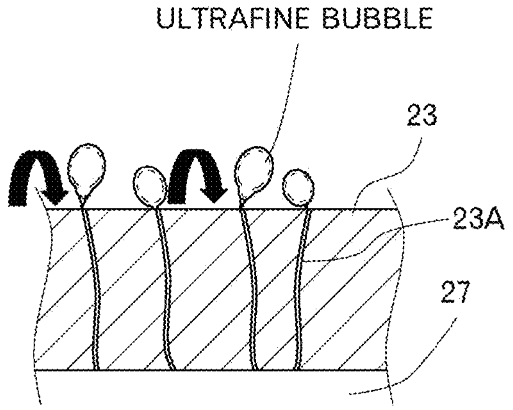
FIG. 4 is a partially enlarged front view illustrating the gas bubble production medium according to the first embodiment of the present invention.
Figure 5:
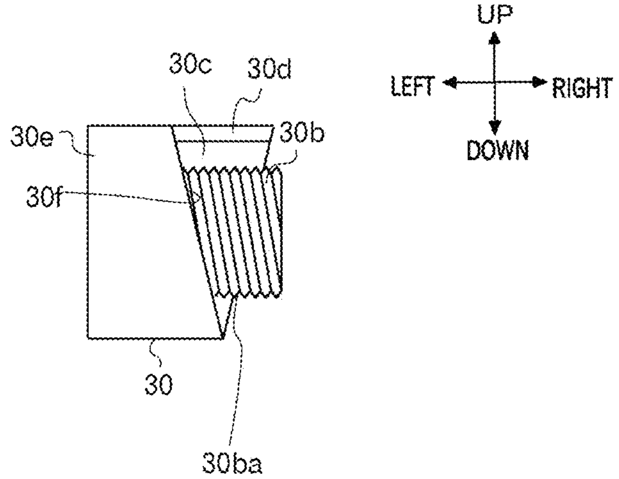
FIG. 5 is a front view illustrating a guide member according to the first embodiment of the present invention.
Figure 6:
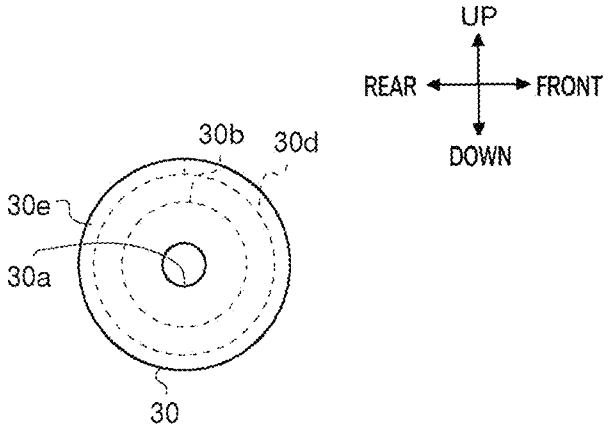
FIG. 6 is a left side view illustrating the guide member according to the first embodiment of the present invention.
Figure 7:
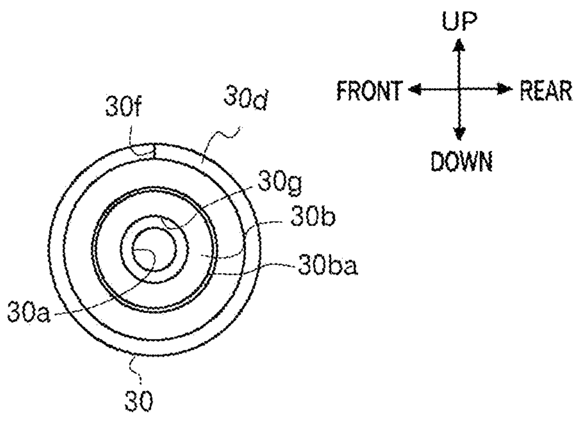
FIG. 7 is a right side view illustrating the guide member according to the first embodiment of the present invention.
Figure 8:
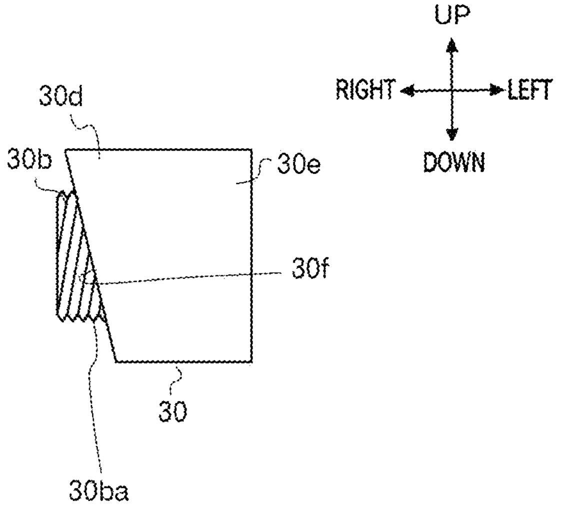
FIG. 8 is a rear view illustrating the guide member according to the first embodiment of the present invention.

Further, the gas bubble production medium 23 is constituted by a carbon-based porous material, and has a large number of fine holes 23A having a diameter of several μm to several ten μm as illustrated in FIG. 4. Further, the gas bubble production medium 23 is a conductor, and a bubble produced from the gas bubble production medium 23 is negatively charged. In other words, when passing through the gas bubble production medium 23 which is a conductor, a free electron is added to an ultra fine bubble, so that the ultra fine bubble is negatively charged. This negative charge can prevent bubbles from repelling each other and coalescing into a large bubble.

The carbon-based porous material is a composite material containing only carbon or carbon and ceramic, and is an inorganic material. Further, a film having a thickness of several nm is formed on a surface of the carbon-based porous material. The film is formed of an inorganic film containing silicon.

Further, as illustrated in FIG. 2 and FIG. 3, the gas bubble production medium 23 is formed in a columnar shape, and a gas bubble production medium passage 27 is formed inside the gas bubble production medium 23 as an internal space. The gas bubble production medium passage 27 is provided inside the gas bubble production medium 23 and is provided at a central portion of a cross section of a column. The gas bubble production medium passage 27 is provided in parallel with an axial direction of the gas bubble production medium 23, and is formed so that gas travels straight from an upstream direction to a downstream direction.

The downstream side end portion 23*a* of the gas bubble production medium 23 is tapered in a manner that the diameter decreases toward the downstream side. An inclination angle of the downstream side end portion 23*a* is formed to be 30 degrees to 45 degrees.

The pipe 25 is formed in a cylindrical shape, and has a cylindrical side surface 25*a* and circular end surfaces 25*b*. That is, the pipe 25 is closed by the side surface 25*a* and the end surfaces 25*b*. The side surface 25*a* is provided with a liquid current inflow port 25*c*. The liquid current inflow port 25*c* is connected to a pressure pump 17 that pumps and pressure-feeds liquid, and the pressure-fed liquid is sent from the liquid current inflow port 25*c* to the inside of the pipe 25. As illustrated in FIG. 3, the liquid current inflow port 25*c* is provided on the side surface 25*a* of the pipe 25 at a position shifted from a direction orthogonal to an axial center in plan view. That is, the liquid current inflow port 25*c* is arranged at a position shifted by a predetermined length in a front-rear direction with respect to the axial center. In other words, the liquid current inflow port 25*c* is provided to face a position shifted from an axial center of the gas bubble production medium 23. By the above, liquid entering from the liquid current inflow port 25*c* does not flow in a direction toward the axial center of the gas bubble production medium 23, but easily flows to the downstream side while spirally rotating along the side surface 25*a*.

The pipe 25 is made from hard resin such as hard polyvinyl chloride or polyethylene. Further, the pipe 25 may be made from a carbon-based porous material. Here, the carbon-based porous material is a composite material containing only carbon or carbon and ceramic, and is an inorganic material. By being made from the carbon-based porous material, the pipe 25 has improved corrosion resistance and acid resistance as compared with a case of being formed of hard resin.

The downstream side end portion 25*d* of the pipe 25 is processed in such a manner that an inner diameter decreases toward the downstream side in accordance with an inclination angle of a downstream side end portion of the gas bubble production medium 23. An inclination angle of the downstream side end portion 25*d* is formed to be equal to an inclination angle of the downstream side end portion 23*a* of the gas bubble production medium 23, and is formed to be from 30 degrees to 45 degrees.

Further, a columnar guide member 30 is provided on the end surface 25*b* on the upstream side of the pipe 25. The guide member 30 has an outer diameter equivalent to an inner diameter of the pipe 25, and also serves to seal the end surface 25*b* of the pipe 25.

As illustrated in FIG. 5 to FIG. 8, the guide member 30 has a double cylindrical structure, and a gas inflow hole 30*a* connected to the gas bubble production medium passage 27 is provided at the innermost side. A first wall portion 30*b* is provided on an outer periphery of the gas inflow hole 30*a*, and a liquid passage portion 30*c* through which a liquid current flows is provided on an outer periphery of the first wall portion 30*b*. A guide groove 30*ba* for rotating a liquid current in a helical manner is formed on an outer surface in a radial direction of the first wall portion 30*b*.

The guide member 30 is formed to have a length of 20% or less with respect to a length in an axial direction of the pipe 25. By the above, it is possible to ensure a minimum opportunity for a liquid current to come into contact with a guide member and to guide the liquid current in a helical manner.

The guide groove 30*ba* is formed in a helical manner on a surface of the first wall portion 30*b*. In the present embodiment, the guide groove 30*ba* is formed by cutting the first wall portion 30*b*. Note that in a manufacturing process of the guide groove 30*ba*, not only cutting but also pressing using a mold can be performed.

A second wall portion 30*d* is provided outside the liquid passage portion 30*c*. The first wall portion 30*b* and the second wall portion 30*d* are connected to an upstream end wall portion 30*e* formed in a circular shape. The upstream end wall portion 30*e* communicates with the gas inflow hole 30*a*, and the gas inflow hole 30*a* is connected to a gas passage 55 connected to the compression device 22 at an upstream end of the pipe 25.

Further, the liquid passage portion 30*c* is shielded from an upstream end of the pipe 25 by the upstream end wall portion 30*e*. With such a configuration, liquid is restricted so as not to pass to the upstream side of the guide member 30. Further, a notch portion 30*f* is provided from a middle portion in an axial direction of the second wall portion 30*d* toward the downstream side. The notch portion 30*f* is configured such that the second wall portion 30*d* is not provided at a position facing the liquid current inflow port 25*c* of the pipe 25.

With such a configuration, a liquid current flowing in from the liquid current inflow port 25*c* passes through the notch portion 30*f* and flows to the downstream side along the first wall portion 30*b*. Since the guide groove 30*ba* is formed on the first wall portion 30*b*, a liquid current becomes a helical shape and easily flows to the downstream side. By providing the guide member 30 in this manner, flow of liquid flowing in from the liquid current inflow port 25*c* can be guided in a helical manner. Also on the downstream side, since liquid flows while maintaining helical flow created by the guide member 30, a chance of contact between the liquid current and the gas bubble production medium increases. Further, since flow of liquid is not hindered by a plate material or the like, a chance of contact can be increased while a flow rate is maintained.

Figure 9:
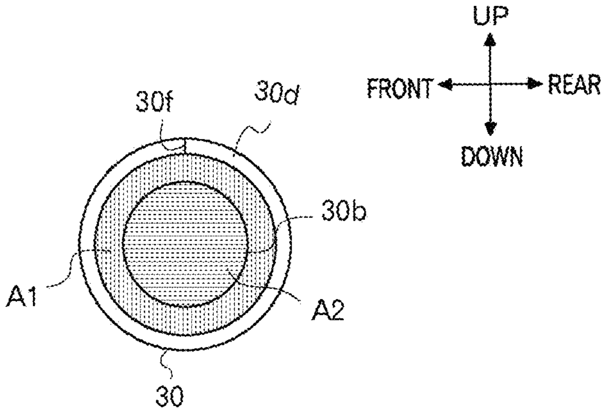
FIG. 9 is a right side view illustrating an area ratio between a liquid passage portion and a first wall portion according to the first embodiment of the present invention.

Further, as illustrated in FIG. 9, an area ratio (area A2 drawn by a horizontal line in FIG. 9) between a cross-sectional area (area A1 drawn by a vertical line in FIG. 9) of a plane orthogonal to an axial direction of the liquid passage portion 30*c* and a cross-sectional area of a circle whose radius is a distance from an axial center of the first wall portion 30*b* to an outer peripheral surface is 1:1 or more and 2:1 or less. With this configuration, liquid flowing in from the liquid current inflow port 25*c* easily flows in a helical manner while being guided by the first wall portion 30*b* and the second wall portion 30*d*.

A fitting structure is employed for a connection portion of the guide member 30 with the gas bubble production medium 23. Specifically, a downstream side end portion of the gas inflow hole 30*a* of the guide member 30 is enlarged in diameter to form a fitting groove 30*g*. Further, a fitting protrusion 23*b* is provided at an upstream side end portion of the gas bubble production medium 23. A seal member 35 is provided on a fitting surface between the fitting protrusion 23*b* and the fitting groove 30*g*.

The seal member 35 is a member that is configured in an annular shape and prevents gas from leaking from the fitting structure. Further, by assembling the fitting structure via the seal member 35, it is not necessary to fix the guide member 30 to the gas bubble production medium 23 with a screw, a bolt, or the like. Further, the fitting structure only needs to be removed at the time of removal, disassembly for cleaning can be easily performed. Since the guide member 30 and the gas bubble production medium 23 can be connected without using a screw or a bolt, the ultra fine bubble production device 1 can be disposed even in an environment where metal is likely to corrode such as in sea water. In this way, by configuring a coupling portion with the fitting structure, a portion where the seal member is provided can be made small, and gas hardly leaks.

Next, a method of producing an ultra fine bubble by the ultra fine bubble production device 1 will be described. In the present embodiment, a method of producing an ultra fine bubble using water of a water source such as a river as liquid and using oxygen as gas will be described.

First, oxygen is pressure-fed from the compression device 22. Oxygen pressure-fed from the compression device 22 is sent into the passage 21 through the gas passage 55. The guide member 30 is provided at an upstream end portion of the pipe 25 of the passage 21, and oxygen is supplied to the gas bubble production medium passage 27 in the gas bubble production medium 23 through the gas inflow hole 30*a* of the guide member 30.

On the other hand, water from a water source such as a river is pumped up by the pressure pump 17 and sent to the inside of the pipe 25 from the liquid current inflow port 25*c* provided on the side surface 25*a* of the pipe 25. A liquid current flowing in from the liquid current inflow port 25*c* passes through the notch portion 30*f* and flows to the downstream side along the first wall portion 30*b*. Since the guide groove 30*ba* is formed on the first wall portion 30*b*, a liquid current becomes a helical shape and easily flows to the downstream side (see a black arrow in FIG. 2). A liquid current flowing downstream in a helical manner is sent further to the downstream side along a surface of the gas bubble production medium 23.

Oxygen supplied to the gas bubble production medium passage 27 passes through the fine hole 23A having a diameter of several μm to several ten μm provided in the gas bubble production medium 23, becomes an ultra fine bubble, and is released into liquid. An ultra fine bubble released into liquid is separated from a surface by surrounding liquid flow (flow in an arrow direction in FIG. 3) at a moment of release to a surface of the gas bubble production medium 23. At this time, since liquid flows in a helical manner by the guide member 30, a chance of contact between a surface of the gas bubble production medium 23 and a liquid current is high as compared with a case where the liquid current travels straight, and an ultra fine bubble is easily separated.

Further, since a downstream side end portion of the gas bubble production medium 23 and a downstream side end portion of the pipe 25 are processed so as to decrease in diameter toward the downstream side, helical flow flowing through the pipe 25 gathers toward the center of the pipe 25, and thus a flow rate is not reduced and a diameter of swirling flow decreases, and an ultra fine bubble is more efficiently generated. Further, since an inclination angle of a downstream side end portion of the gas bubble production medium 23 is equal to an inclination angle of a downstream side end portion of the pipe 25, a distance between the gas bubble production medium 23 and the pipe 25 becomes constant, and a cross-sectional area of a portion where fluid flows becomes constant. By the above, a flow rate is less likely to change, and release from the pipe 25 can be performed without lowering in a flow rate.

With such a configuration, an ultra fine bubble moves into liquid alone without coalescing with an ultra fine bubble produced later and an ultra fine bubble produced from a peripheral one of the holes 23A. Further, in the ultra fine bubble production device 1 for cultivation, since it is not necessary to use a strong pump, noise generated in water can be reduced, and stress on fish and shellfish can be reduced.

As described above, in a case of the ultra fine bubble production device for cultivation, fish and shellfish are cultured in liquid in which gas is dissolved or coexists in the storage tank 11.

Further, in a case of the ultra fine bubble production device for wastewater treatment, liquid in which gas is dissolved or coexists is stored in the storage tank 11, and the stored liquid is purified by an action of the gas dissolved in the liquid or coexisting as an ultra fine bubble. More specifically, bacteria and the like that decompose an organic substance in wastewater can be activated by an action of gas dissolved in liquid or coexisting as an ultra fine bubble, and the liquid can be purified.

As described above, the ultra fine bubble production device 1 is an ultra fine bubble production device including the pipe 25 through which liquid flows, the compression device 22 for pressure-feeding gas to the pipe 25, and the gas bubble production medium 23 for releasing gas pressure-fed by the compression device 22 to liquid in the pipe 25 as an ultra fine bubble. The gas bubble production medium 23 is formed of a carbon-based porous material, the pipe 25 has the side surface 25*a* having a cylindrical shape and the end surfaces 25*b* having a circular shape, the liquid current inflow port 25*c* is provided on the side surface 25*a*, the cylindrical guide member 30 is arranged so as to be connected to the liquid current inflow port 25*c*, and the guide member 30 has the guide groove 30*ba* having a helical shape.

With such a configuration, since the gas bubble production medium 23 is formed of a porous member of a carbon-based material, a large amount of ultra fine bubbles can be produced without liquid flow produced by a liquid jet nozzle or the like. Further, since the guide member 30 is provided, flow of liquid flowing in from the liquid current inflow port 25*c* can be guided in a helical manner. Then, also on the downstream side, since liquid flows while maintaining helical flow created by the guide member 30, a chance of contact between the liquid current and the gas bubble production medium 23 increases. Further, since flow of liquid is not hindered by a plate material or the like, a chance of contact can be increased while a flow rate is maintained.

Further, the guide member 30 has a double wall structure including the first wall portion 30*b* and the second wall portion 30*d*, and the notch portion 30*f* is provided in a part of the second wall portion 30*d* facing a liquid current.

With this configuration, a liquid current entering the inside of the pipe 25 from the liquid current inflow port 25*c* passes through the second wall portion 30*d* and flows in a helical manner along the guide groove 30*ba* provided on an outer surface of the first wall portion 30*b*. By the above, the guide member 30 can guide flow of liquid flowing in from the liquid current inflow port 25*c* in a helical manner.

Further, the liquid current inflow port 25*c* is provided on the side surface 25*a* of the pipe 25 so as to face a position shifted from an axial center of the gas bubble production medium 23.

With this configuration, liquid entering from the liquid current inflow port 25*c* does not flow in a direction toward the axial center of the gas bubble production medium 23, but easily flows to the downstream side while spirally rotating along the side surface 25*a*. By the above, a chance of contact between the gas bubble production medium 23 and a liquid current increases, and an ultra fine bubble can be efficiently produced.

REFERENCE SIGNS LIST

1 fine bubble production device
11 storage tank
17 pressure pump
21 passage
22 compression device
22A gas storage container
22B check valve
23 gas bubble production medium
23A hole
23*a* downstream side end portion
25 pipe
25*a* side surface
25*b* end surface
25*c* liquid current inflow port
25*d* downstream side end portion
27 gas bubble production medium passage
30 guide member
30*a* gas inflow hole
30*b* first wall portion
30*ba* guide groove
30*c* liquid passage portion
30*d* second wall portion
30*e* upstream side wall portion
30*f* notch portion
55 gas passage

The invention claimed is:

1. An ultra fine bubble production device comprising:

a pipe through which liquid flows;

a compression device for pressure-feeding gas to the pipe; and a gas bubble production medium that releases gas pressure-fed by the compression device to liquid in the pipe as an ultra fine bubble, wherein the gas bubble production medium is formed of a carbon-based porous material, and the pipe has a cylindrical side surface and circular end surfaces, a liquid current inflow port is provided on the side surface, a cylindrical guide member is arranged so that a liquid current from the liquid current inflow port is guided, and the guide member has a helical guide groove, and wherein the guide member has a double wall structure including an outer wall and an inner wall, and a notch portion is provided in a part of the outer wall facing a liquid current.

2. The ultra fine bubble production device according to claim 1, wherein the liquid current inflow port is provided on a side surface of a pipe in a manner facing a position shifted from an axial center of the gas bubble production medium.

* * * * *